United States Patent
Pan et al.

(10) Patent No.: US 9,270,181 B2
(45) Date of Patent: Feb. 23, 2016

(54) AUTOMATIC ADJUSTING DEVICE FOR OUTPUT POWER

(71) Applicant: INFINNO TECHNOLOGY CORP., Hsinchu County (TW)

(72) Inventors: Jui-Hsiang Pan, Hsinchu County (TW); Ming-Zhi Tzeng, Hsinchu County (TW)

(73) Assignee: Infinno Technology Corp., Hsinchu County (TW)

( * ) Notice: Subject to any disclaimer, the term of this patent is extended or adjusted under 35 U.S.C. 154(b) by 0 days.

(21) Appl. No.: 13/790,155

(22) Filed: Mar. 8, 2013

(65) Prior Publication Data

US 2013/0294116 A1 Nov. 7, 2013

Related U.S. Application Data

(60) Provisional application No. 61/641,366, filed on May 2, 2012.

(51) Int. Cl.
*H02M 3/335* (2006.01)
*H02H 3/08* (2006.01)
(Continued)

(52) U.S. Cl.
CPC ............ *H02M 3/33507* (2013.01); *H02M 1/32* (2013.01)

(58) Field of Classification Search
CPC ......... H02M 1/32; H02M 1/36; H02M 3/335; H02M 3/3353; H02M 3/3358; H02M 3/33507; H02M 2001/32; H02M 2001/325; H02M 3/33515; H02M 3/33538; H02M 3/33546; H02M 3/337; H02M 2001/0025; H02M 2001/0009; H02M 7/53871; G05F 1/569; G05F 1/571; G05F 1/573; H02H 1/00

USPC ............ 363/21.04–21.18, 50–58, 89, 74–79; 323/271–288, 351, 908, 205–211, 323/222–226; 361/18, 59, 71, 78–92, 361/93.1–102, 60; 324/202, 76.79, 601, 324/754.01

See application file for complete search history.

(56) References Cited

U.S. PATENT DOCUMENTS

| | | | | |
|---|---|---|---|---|
| 5,617,016 | A * | 4/1997 | Borghi et al. | 323/284 |
| 5,909,583 | A * | 6/1999 | Hayes et al. | 713/300 |
| 7,209,334 | B2 * | 4/2007 | Gentillet et al. | 361/93.1 |
| 2004/0174722 | A1 | 9/2004 | Kunii | |
| 2005/0125230 | A1 * | 6/2005 | Haas | 704/270 |

(Continued)

FOREIGN PATENT DOCUMENTS

| CN | 2727979 Y | 9/2005 |
|---|---|---|
| CN | 201956692 U | 8/2011 |

(Continued)

*Primary Examiner* — Timothy J Dole
*Assistant Examiner* — Carlos Rivera-Perez
(74) *Attorney, Agent, or Firm* — Rosenberg, Klein & Lee

(57) ABSTRACT

An automatic adjusting device is provided, which is used for adjusting an output power of a power supply and comprises an automatic adjusting circuit. The automatic adjusting circuit includes a comparing unit and a programmable signal generating unit. The comparing unit compares a limiting level and a protection level and produces a comparison signal. The protection level limits the output power provided by the power supply. The programmable signal generating unit generates the protection level and adjusts the protection level according to the comparison signal for adjusting the output power. The programmable signal generating unit will adjust the protection level according to the limiting level. Thereby, the output power can be adjusted automatically without manual adjustment. Consequently, the cost can be reduced and the adjusting accuracy can enhanced.

11 Claims, 9 Drawing Sheets

(51) Int. Cl.
*H02H 9/02* (2006.01)
*H02M 1/32* (2007.01)

(56) References Cited

U.S. PATENT DOCUMENTS

2008/0012584 A1* 1/2008 Pai et al. .................. 324/713
2010/0225466 A1* 9/2010 Liu et al. .................. 340/514
2012/0185201 A1* 7/2012 Chen ......................... 702/118

FOREIGN PATENT DOCUMENTS

| CN | 102237789 A | 11/2011 |
| CN | 102402191 A | 4/2012 |
| CN | 102427216 A | 4/2012 |
| TW | 591234 B | 6/2004 |
| TW | 200915040 A | 4/2009 |
| TW | 201033781 A | 9/2010 |
| TW | 201128211 A | 8/2011 |

* cited by examiner

AUTOMATIC ADJUSTING DEVICE FOR OUTPUT POWER

REFERENCE TO RELATED APPLICATION

This Application is based on Provisional Application Ser. No. 61/641,366, filed 2 May 2012, currently pending.

FIELD OF THE INVENTION

The present invention relates generally to an automatic adjusting device, and particularly to an automatic adjusting device for output power.

BACKGROUND OF THE INVENTION

Power supplies provide power required by electronic devices. Depending on the circuit structure, there are linear power supplies and switching power supplies. Power supplies are extensively applied to various fields such as mobile communication devices, personal digital assistants, computer and peripheral equipment, servers, and network equipment. Thereby, power supplies power supplier play a crucial role in electronic devices.

The protection mechanism in the control circuit of a power supply provides very important functions, such as over-voltage, over-current, over-power, and low-voltage protection, for normal operations and preventing damages. Once the situation of overload, short circuit, or low voltage occurs, the power supply with complete protection mechanism will stop supplying the output power for avoiding damages on internal devices or relevant equipment. In other words, the protection mechanism is used for limiting the output power of the power supply. In general, there is a protection level inside the power supply. When the voltage or current exceeds the protection level, it is regarded that the situation of over voltage, over current, or over power occurs. At this time, the power supply is shut off for protecting the power supply and the other relevant equipment.

Nonetheless, the protection levels among different batches of power supplies differ due to the accumulation of production errors in circuit devices such as resistors, inductors, or capacitors. As a result, there are differences in the output power among different batches of power supplies. For solving this problem, generally, a variable resistor is further disposed in the power supply. By adjusting the resistance of the variable resistor manually, the protection level is adjusted. Consequently, the labor cost is increased. Besides, after long-term usage, the variable resistor will chap or fall off and varying the protection level, which, in turn, leads to inaccuracy in the limiting level of the output power. At worst, the power supply might be even damaged.

FIG. 1 shows a production flowchart of the power supply according to the prior art. Because a variable resistor is required in the power supply according to the prior art for adjusting the protection level, in the production process, the step S1 is first performed for disposing the variable resistor in the circuit by manual insertion. Afterwards, the step S2 is performed for soldering the variable resistor on the circuit by using a tin furnace. Then, the step S3 is performed for initializing the power supply, which includes testing and tuning on the stability of the power supply and adjustment for over voltage and over current. The adjustment described above is to adjust the resistance of the variable resistor manually. Next, the steps S4 is executed for performing burn-in. afterwards, the step S5 is performed for the hi-pot test. Then, the step S6 is performed for the protection test. Next, the step S7 is performed for the function test. Finally, the step S8 is performed for the power test.

It is known form the above that in the power supply according to the prior art, a variable resistor is required. By adjusting the resistance of the variable resistor, the protection level is adjusted, which, in turn, adjusts the output power of the power supply. This method is extremely labor intensive and thus leading to increase in cost. In addition, because the variable resistor in the circuit is vulnerable to damages or aging due to external factors such as humidity and temperature, the resistance may vary and thereby altering the protection level. Consequently, errors in the protection level from the initial setup may occur, and hence influencing the output power of the power supply.

Accordingly, the present invention provides an automatic adjusting device for solving the problems described above. According to the present invention, the protection level can be adjusted automatically and thus fixing the level of the output power to the expected limits without using the variable resistor and adjusting the protection level manually. Thereby, the problems in the prior art as described above can be solved.

SUMMARY

An objective of the present invention is to provide an automatic adjusting device for output power. The automatic adjusting device according to the present invention has a programmable signal generating unit for generating the protection level. The protection level is adjusted according to the difference between a limiting level and the protection level for adjusting the output power automatically. Without extra labor, the cost can be reduced and the adjusting accuracy is enhanced.

The present invention discloses an automatic adjusting device for output power, which is used for adjusting an output power of a power supply and comprises an automatic adjusting circuit. The automatic adjusting circuit includes a comparing unit and a programmable signal generating unit. The comparing unit compares a limiting level and a protection level and produces a comparison signal. The protection level limits the output power provided by the power supply. The programmable signal generating unit generates the protection level and adjusts the protection level according to the comparison signal for adjusting the output power.

DETAILED DESCRIPTION

In order to make the structure and characteristics as well as the effectiveness of the present invention to be further understood and recognized, the detailed description of the present invention is provided as follows along with embodiments and accompanying figures.

Figure 1:
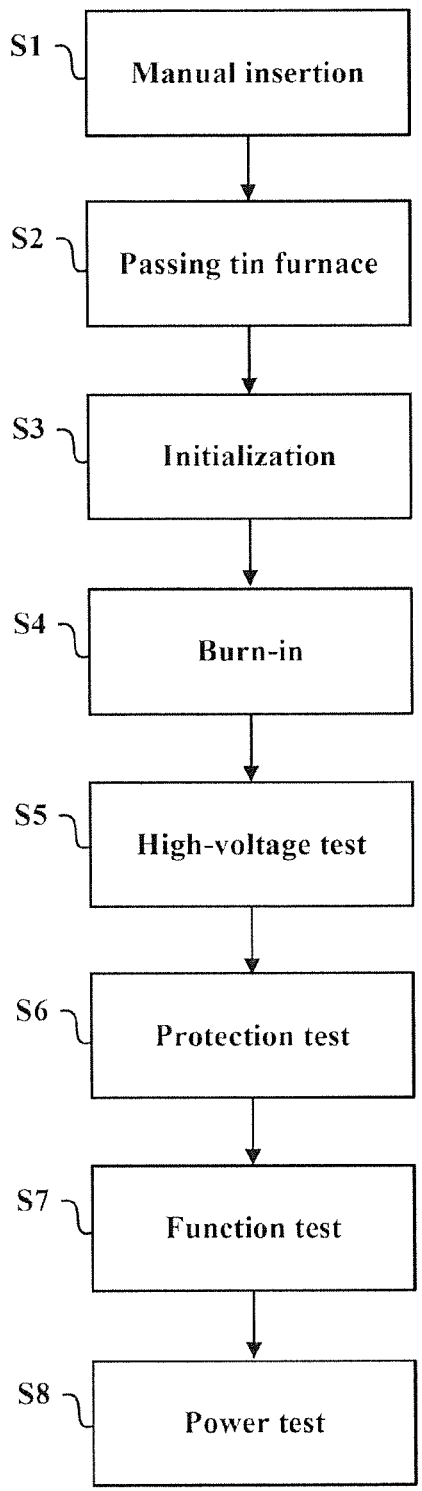
FIG. 1 shows a production flowchart of the power supply according to the prior art.
Figure 2:
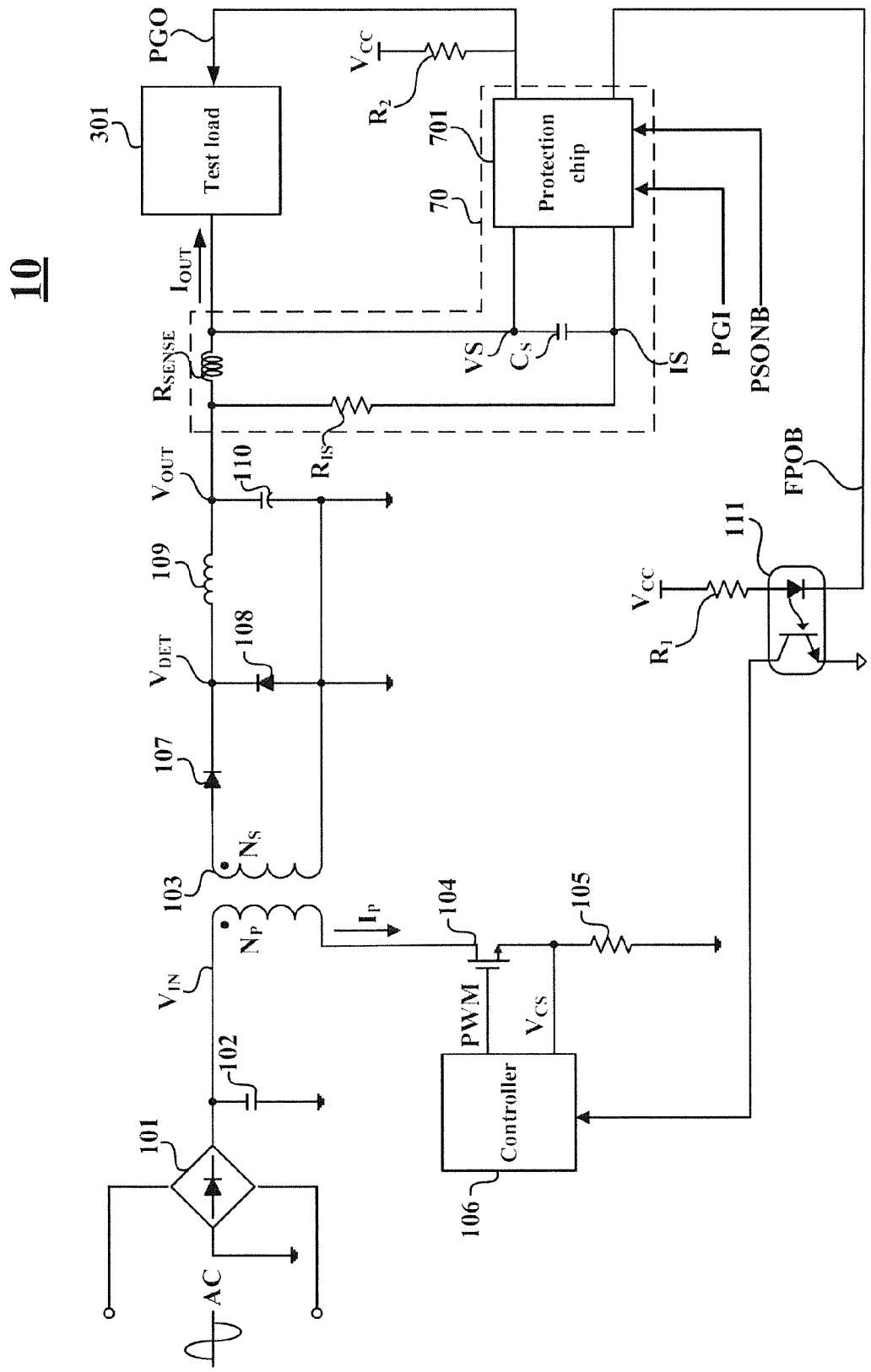
FIG. 2 shows a circuit diagram of the power supply according to an embodiment of the present invention.

FIG. 2 shows a circuit diagram of the power supply according to an embodiment of the present invention. As shown in the figure, the power supply 10 according to the present invention comprises a bridge rectifier 101, a plurality of capacitors 102, 110, an inductor 109, a power transistor 104, a resistor 105, a plurality of diodes 107, 108, a controller 106, and a transformer 103 having a primary side and a secondary side. The primary side includes a primary winding $N_P$, and the secondary side includes a secondary winding $N_S$. One terminal of the capacitor 102 is coupled to an output of the bridge rectifier 101 and one terminal of the primary winding $N_P$; the other terminal of the capacitor 102 is coupled to a ground. The bridge rectifier 101 rectifies an input power AC to a DC voltage. The capacitor 102 filters the DC voltage, produces a DC input voltage $V_{IN}$, and supplies the DC input voltage $V_{IN}$ to the primary winding $N_P$.

The power transistor 104 is used for switching the transformer 103 and thus controlling the conversion of the energy from the primary winding $N_P$ of the transformer 103 to the secondary winding $N_S$. A draw of the power transistor 104 is connected in series with the other terminal of the primary winding $N_P$. The controller 106 is coupled to a gate of the power transistor 104. The controller 106 produces a switching signal PWM and outputs the switching signal PWM to the power transistor 104 for controlling the power transistor 104 and switching the transformer 103. The resistor 105 is coupled between a source of the power transistor 104 and the ground. A switching current $I_P$ of the transformer 103 flows through the resistor 105 and produces a current sensing signal $V_{CS}$ at the resistor 105. The current sensing signal $V_{CS}$ is transmitted to the controller 106, which produces the switching signal PWM according to the current sensing signal $V_{CS}$ and a feedback signal (not shown in the figure). The feedback signal is related to the loading status of the power supply 10. The method for producing the feedback signal is well known to a person having ordinary skill in the art. Hence, the details will not be described here. The anodes of the diodes 107, 108 are coupled to both terminals of the secondary winding $N_S$ of the transformer 103, respectively. A terminal of the inductor 109 is coupled to the cathodes of the diodes 107, 108. The other terminal of the inductor 109 is coupled to the output of the power supply 10. The capacitor 110 is coupled between the output of the power supply 10 and the ground and thus producing the output power, which is the output voltage $V_{OUT}$ or the output current $I_{OUT}$.

Refer again to FIG. 2. The automatic adjusting device according to the present invention is used for adjusting the output power of the power supply 10 such as adjusting a maximum level of the output voltage $V_{OUT}$ or the output current $I_{OUT}$. The automatic adjusting device according to the present invention comprises an automatic adjusting circuit 70 and a test load 301. The automatic adjusting circuit 70 includes a sensing device $R_{SENSE}$, an impedance device $R_{IS}$, and a protection chip 701. The sensing device $R_{SENSE}$ is coupled between the output and the test load 301. The test load 301 is coupled to the output of the power supply 10 by way of the sensing device $R_{SENSE}$ and draws the output power. The test load 301 is used during the tuning and adjusting period for adjusting the output power of the power supply 10. Under normal operations, there is no test load 301 coupled to the power supply 10. Instead, the power supply 10 is coupled to the output load. The sensing device $R_{SENSE}$ produces a sensing signal VS according to the output power supplied to the test load 301 and the sensing signal VS is related to the state of the output power of the power supply 10. According to the present embodiment, the sensing signal VS is determined by the impedance of the sensing device $R_{SENSE}$ and the amplitude of the output current $I_{OUT}$. In the present invention, when the automatic adjusting device adjusts the output power of the power supply 10, the sensing signal VS is used as a limiting level.

The impedance device $R_{IS}$ is coupled between the output of the power supply 10 and the protection chip 701 for producing a protection level IS and providing the protection level IS to the protection chip 701. The protection level IS limits the output power provided by the power supply 10, The protection chip 701 is coupled to the impedance device $R_{IS}$ and the sensing device $R_{SENSE}$. When the automatic adjusting device adjusts the output power of the power supply 10, the protection chip 701 compare the sensing signal VS with the protection level IS and adjusts the output power according to the comparison result. The details of adjusting the output power will be described later. In addition, a capacitor $C_S$ is coupled between the impedance device $R_{IS}$ and the sensing device $R_{SENSE}$ for suppressing noises.

The protection chip 701 is coupled to the output of the power supply 10. When the power supply 10 is used normally, the protection chip 701 judges if over voltage, low voltage, or over current occurs according to the sensing signal VS and the protection level IS. When over voltage, low voltage, or over current occurs in the power supply 10, the protection chip 701 produces a protection signal FPOB and transmits the protection signal FPOB to the controller 106 for driving the controlling 106 to disable the power supply 10. According an embodiment, an optocoupler 111 is coupled between the protection chip 107 and the controller 106. The protection signal FPOB is transmitted to the controller 106 by way of the controller 106. Besides, a resistor $R_1$ is coupled between the optocoupler 111 and a supply voltage $V_{cc}$.

The protection chip 701 receives an activation signal PSONB and disables the protection signal FPOB according to the activation signal PSONB for activating the power supply 10. Moreover, the protection chip 701 is further coupled to the connection point between the diodes 107, 108 of the power supply 10 for receiving a detecting voltage $V_{DET}$. By using the detecting voltage $V_{DET}$ as a power good input (PGI) signal, the state of the output power of the power supply 10 can be detected. The protection chip 701 produces a power good output (PGO) signal according to the PGI signal. The PGO signal is used for indicating if the output power of the power supply 1 is normal. Thereby. the PGO signal is equivalent to a confirmation signal. A resistor $R_2$ is coupled between the supply voltage $V_{CC}$ and the protection chip 701 for producing the PGO signal.

When the state of the output power of the power supply 10 is normal, the protection chip 701 enables the PGO signal according to the PGI signal. As the automatic adjusting device adjusts the output power of the power supply 10, the protection chip 701 will adjust the output power automatically according to the activation signal PSONB and the PGO signal. At this moment, the protection chip 701 will transmit the PGO signal to the test load 301. Upon receiving the PGO signal, the test load 301 will start to draw the output power for performing automatic adjusting of the output power.

Figure 3:
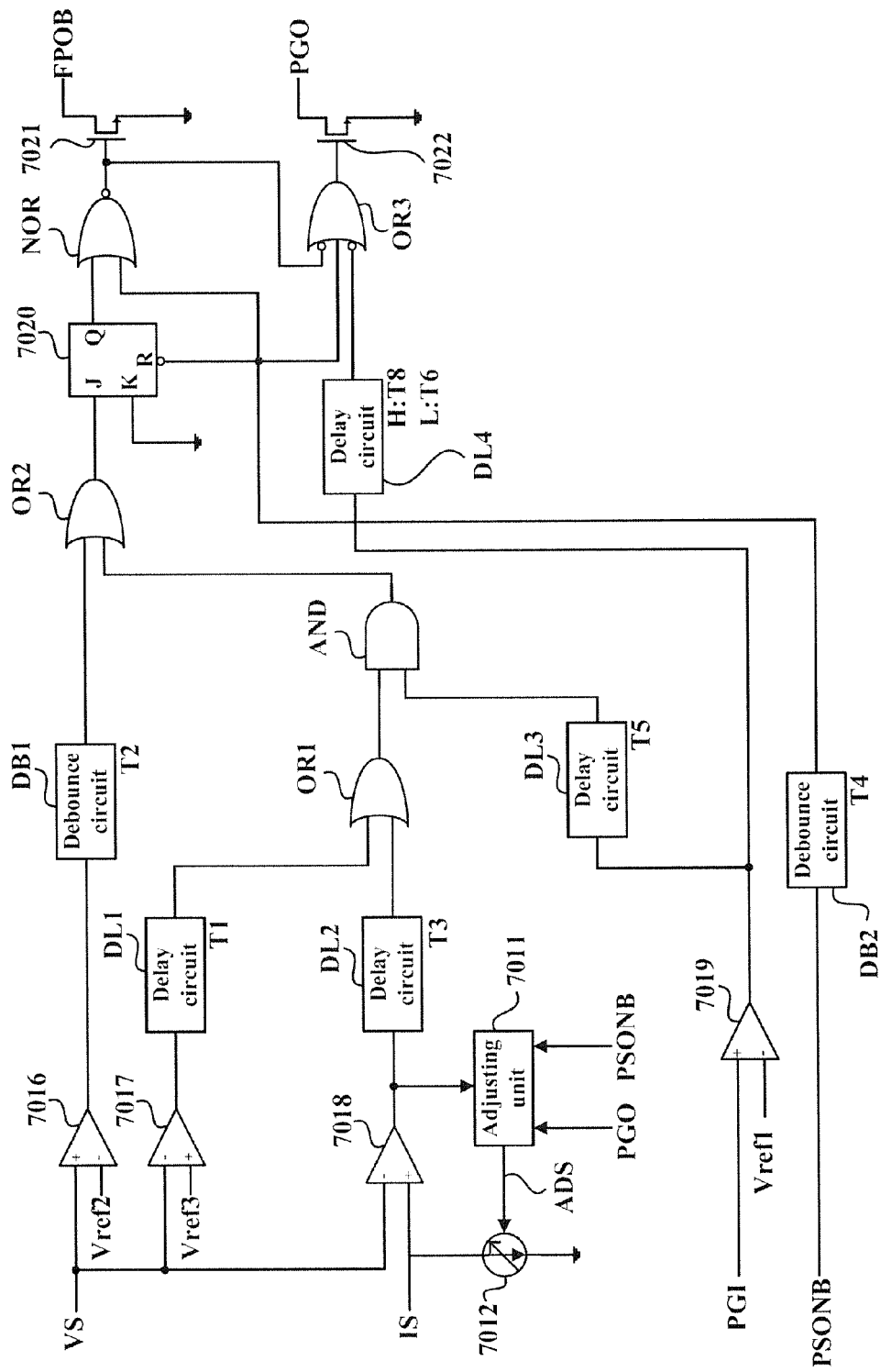
FIG. 3 shows a circuit diagram of the protection chip according to an embodiment of the present invention.

FIG. 3 shows a circuit diagram of the protection chip according to an embodiment of the present invention. As shown in the figure, the protection chip 701 includes a plurality of comparing units 7016, 7017, 7018, 7019, a flip-flop 7020, an adjusting unit 7011, a programmable signal generating unit 7012, a plurality of debounce circuits DB1, DB2, a plurality of delay circuits DL1, DL2, DL3, DL4, a plurality of OR gates OR1, OR2, OR3, a NOR gate NOR, an AND gate AND, and a plurality of transistors 7021, 7022.

The debounce circuit DB2 receives the activation signal PSONB. As the level of the activation signal PSONB is changed from high to low and maintained for a time T4, the debounce circuit DB2 outputs a low output signal for activating the power supply 10. In other words, when the level of the activation signal PSONB is maintained low, the debounce circuit DB2 does not output the activation signal PSONB until after the delay time T4. The debounce circuit DB2 is used for eliminating the debouncing phenomena. Thereby, false activation of the power supply 10 due to a transient low level of the activation signal PSONB caused by noises or external factors can be avoided.

An input of the NOR gate NOR is coupled to an output of the debounce circuit DB2 for receiving the output signal of the debounce circuit DB2. An output of the NOR gate NOR is coupled to gate of the transistor 7021 for controlling the transistor 7021. A source of the transistor 7021 is coupled to the ground. A draw of the transistor 7021 is coupled to the optocoupler 111, as shown in FIG. 2, for producing the protection signal FPOB. When the level of the output signal of the debounce circuit DB2 is low, the level of the output signal of the NOR gate NOR is high and hence turning on the transistor 7021. Thereby, the level of the protection signal FPOB is low, which means that the power supply 10 is normal. Then the controller 106, as shown in FIG. 2, will activate the power supply 10. In addition, the output of the debounce circuit DB2 is further coupled to a reset R of the flip-flop 7020 and a non-inverse input of the OR gate OR3. The output of the NOR gate NOR is further coupled to an inverse input of the OR gate OR3.

A positive input of the comparing unit 7019 receives the PGI signal and a negative input thereof receives a reference level Vref1. The comparing unit 7019 compares the PGI signal with the reference level Vref1 and outputs a comparison signal. The delay circuit DL 4 is coupled between an output of the comparing unit 7019 and an inverse input of the OR gate OR3 and receives the comparison signal of the comparing unit 7019. When the level of the PGI signal is higher than the reference level Vref1, the level of the comparison signal of the comparing unit 7019 is changed from low to high. After the level of the comparison signal of the comparing unit 7019 is high and maintained for a time T8, the delay circuit DL4 output a high output signal. Namely, the delay circuit DL4 does not output the comparison signal of the comparing unit 7019 until delayed for the time T8, which means that the output power of the power supply 10 is normal. The delay circuit DL4 is used for confirming the state of the PGI signal. Thereby, false judgment of the state of the output power of the power supply 10 due to transient variations of the PGI signal caused by noises or external factors can be avoided.

An output of the OR gate OR3 is coupled to a gate of the transistor 7022; a source of the transistor 7022 is coupled to the ground; a draw of the transistor 7022 is coupled to the resistor $R_2$, as shown in FIG. 2. for producing the PGO signal.

As the level of the output signal of the delay circuit DL4 is high, the level of the output signal of the OR gate OR3 is low and thus cutting off the transistor 7022. Consequently, the level of the PGO signal is pulled high by the supply voltage $V_{CC}$, as shown in FIG. 2. Then it means that the output power of the power supply 10 is normal.

Besides, when the level of the PGI signal is lower than the reference signal Vref1, the level of the comparison signal of the comparing unit 7019 is changed from high to low. When the level of the comparison signal of the comparing unit 7019 is changed to low, the delay circuit DL4 does not output the comparison signal of the comparing unit 7019 until after the delay time T6. Then it means that the output power of the power supply 10 is abnormal. As the output signal of the delay circuit DL4 is low, the level of the output signal of the OR gate OR3 is high and hence turning on the transistor 7022. Thereby, the level of the PGO signal is low, meaning that the output power of the power supply 10 is abnormal.

Moreover, the output of the comparing unit 7019 is further coupled to an input of the delay circuit DL3. An output of the delay circuit DL3 is coupled to an input of the AND gate AND. After the level of the comparison signal of the comparing unit 7019 is maintained for a time T5, the delay circuit DL3 outputs the comparison signal of the comparing unit 7019 to the AND gate AND.

Figure 4:
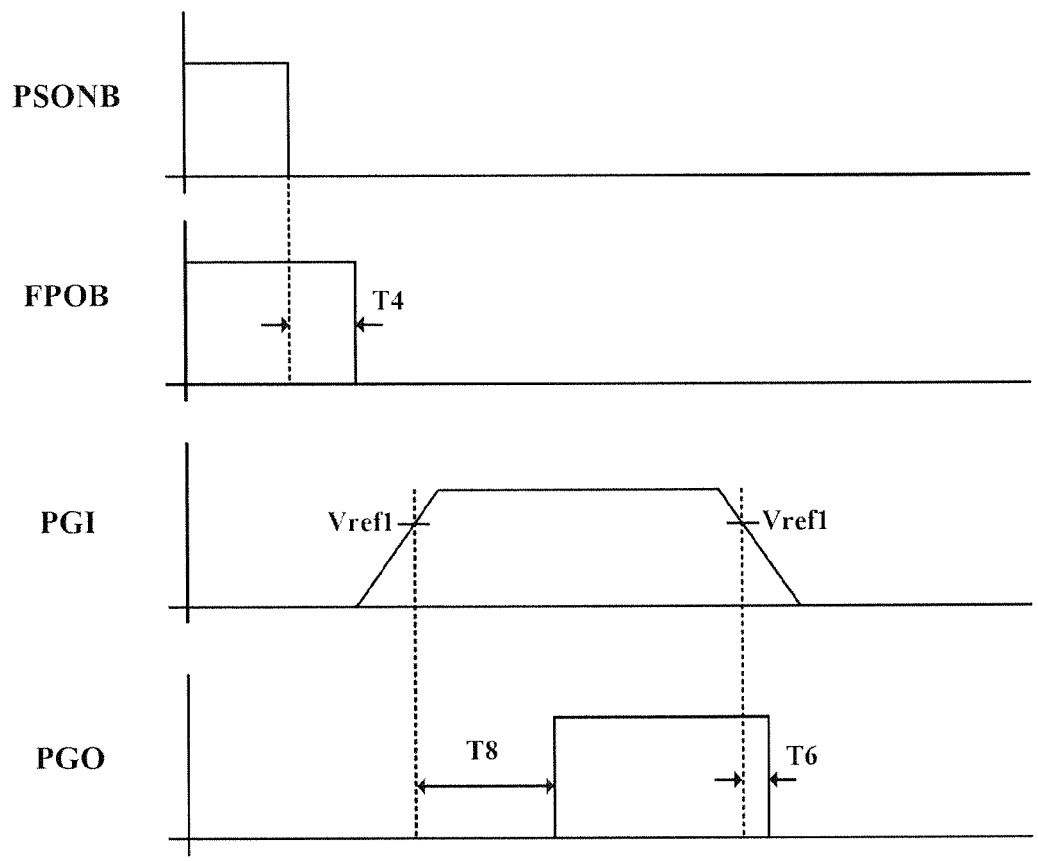
FIG. 4 shows wave diagrams of the power supply operating normally according to the present invention.

FIG. 4 shows wave diagrams of the power supply operating normally according to the present invention. As shown in the figure, as the level of the activation signal PSONB is low, it means to activate the power supply 10. The activation signal PSONB is delayed for the time T4 by the debounce circuit DB2. Then the low-level activation signal PSONB is transmitted to the NOR gate NOR and turning on the transistor 7021. Thereby, the protection signal FPOB is disabled for activating the power supply 10. After the power supply 10 is activated, the output power will be generated, and hence the detecting voltage $V_{DET}$ at the output of the power supply 10, as shown in FIG. 2. will increase. In other words, the level of the PGI signal will increase as well and will be greater than the reference level Vref1. Thereby, the level of the comparison signal of the comparing unit 7019 is high. After the delay time T8, the delay circuit DL4 will output the comparison signal of the comparing unit 7019 to the inverse-input of the OR gate OR3 for cutting off the transistor 7022. Accordingly, the level of the PGO signal is high, which means that the output power of the power supply is normal.

If the power supply 10 has problems, the detecting voltage $V_{DET}$ at the output of the power supply 10 will be reduced. In other words, the level of the PGI signal will be reduced as well and becoming smaller than the reference level Vref1. Then the level of the comparison signal of the comparing unit 7019 is low. It is output to the OR gate OR3 after being delayed for the time T6 by the delay circuit DL4. The level of the output signal of the OR gate OR3 is high and hence turning on the transistor 7022. Thereby, the level of the PGO signal is low, which means that the output power of the power supply 10 is abnormal.

Refer again to FIG. 3. As the power supply 10 is operating, the protection chip 701 receives the sensing signal VS and the protection level IS for sensing the state of the output power of the power supply 10 and judging if over voltage, low voltage, or over current occurs. A positive input of the comparing unit 7016 receives the sensing signal VS; a negative input thereof receives a reference level Vref2 and compares the sensing signal VS with the reference level Vref2. The debounce circuit DB1 is coupled between an output of the comparing unit 7016 and an input of the OR gate OR2. The input of the OR gate OR2 receives the output signal of the debounce circuit DB1. An output of the OR gate OR2 is coupled to an input J of the flip-flop 7020; an output Q of the flip-lop 7020 is coupled to the other input of the NOR gate NOR. The flip-flop 7020 outputs signal to the NOR gate NOR according the output signal of the OR gate OR2. Besides, an input K of the flip-flop 7020 is coupled to the ground.

When the sensing signal VS is higher than the reference level Vref2, the level of the comparison signal output by the comparing unit 7016 is high. After the high-level comparison signal of the comparing unit 7016 is maintained for a time T2, the debounce circuit DB1 output a high-level output signal, meaning that over voltage occurs. When the level of the output signal of the debounce circuit DB1 is high, the level of the output signal of the OR gate OR2 is high, and the level of the output signal of the flip-flop 7020 is high as well. Thereby, the NOR gate NOR will cut off the transistor 7021, making the level of the protection signal FPOB high and meaning that the power supply 10 is abnormal. The protection signal FPOB is transmitted to the controller 106, as shown in FIG. 2. The controller 106 disables the switching signal PWM according to the protection signal FPOB for disabling the power supply 10.

Figure 5:
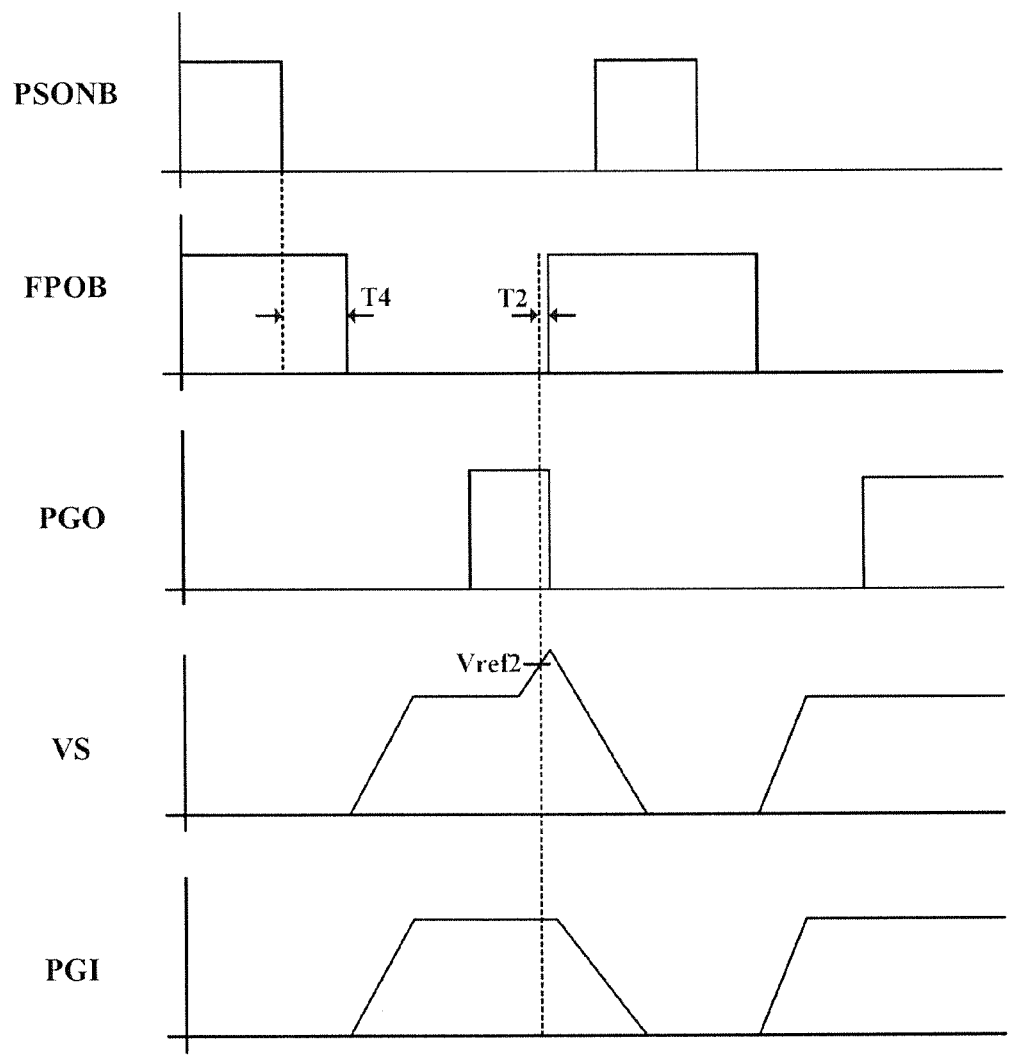
FIG. 5 shows wave diagrams of the protection chip executing over-voltage protection according to the present invention.

FIG. 5 shows wave diagrams of the protection chip executing over-voltage protection according to the present invention. As shown in the figure, as the level of the PGI signal increases and becomes greater than the reference level Vref1, after the delay time T8 delayed by the delay circuit DL4, the level of the PGO signal is high. When the level of the sensing signal VS is higher than the reference level Vref2, the level of the comparison signal of the comparing unit 7016 is high. The comparison signal will be delayed for the time T2 by the debounce circuit DB1. Then the high-level comparison signal of the comparing unit 7016 will be transmitted to the OR gate OR2, which will output a high-level signal to the flip-flop 7020. Thereby, the flip-flop 7020 will drive the NOR gate NOR to output a low-level output signal for cutting off the transistor 7021. Accordingly, the protection signal FPOB is enabled for shutting off the power supply 10. At this time, the levels of the sensing signal VS and the PGI signal will be low because the power supply 10 is shut off.

Refer again to FIG. 3. A negative input of the comparing unit 7017 receives the sensing signal VS; a positive thereof receives a reference level Vref3 and compares the sensing signal VS with the reference level Vref3 for outputting a comparison signal. An input of the delay circuit DL1 is coupled to an output of the comparing unit 7017 and receives the comparison signal of the comparing unit 7017. An output of the delay circuit DL1 is coupled to an input of the OR gate OR1. An output of the OR gate OR1 is coupled to the other input of the AND gate AND. An output of the AND gate AND is coupled to the other input of the OR gate OR2. As the sensing signal VS is lower than the reference level Vref3, the level of the comparison signal of the comparing unit 7017 is high. When the comparison signal of the comparing unit 7017 is high and maintained for a time T1, the delay circuit DL1 output a high-level output signal, which means that low voltage occurs. When the level of the output signal of the delay circuit DL1 is high, the level of the output signal of the OR gate OR1 is high and the output signal of the OR gate OR1 is output to the AND gate AND.

When the levels of output signals of the delay circuits DL1, DL3 are both high, the level of the output signal of the AND gate AND is also high and the output signal of the AND gate AND is transmitted to the OR gate OR2. At this time, the level of the output signal of the OR gate OR2 is high and the level of the output signal of the flip-lop 7020 is also high. Thereby, the NOR gate NOR will cut off the transistor 7021, which makes the level of the protection signal FPOB high, meaning that the power supply 10 is abnormal. The controller 106, as shown in FIG. 2, will disable the switching signal PWM according to the protection signal FPOB for disabling the power supply 10.

The programmable signal generating unit 7012 is coupled to the impedance device $R_{IS}$, as shown in FIG. 2, and a positive input of the comparing unit 7018. The programmable signal generating unit 7012 is used for generating the protection level IS. According to an embodiment of the present invention, the programmable signal generating unit 7012 is a programmable current source, which provides a programmable current for generating the protection level IS. The amplitude of the programmable current and the impedance of the impedance device $R_{IS}$ determine the amplitude of the protection level IS.

A negative input of the comparing unit 7018 receives the sensing signal VS; the positive input thereof receives the protection level IS and compares the sensing signal VS with the protection level IS for outputting a comparison signal. An input of the delay circuit DL2 is coupled to an output of the comparing unit 7018. An output of the delay circuit DL2 is coupled to an output of the OR gate OR1. When the sensing signal VS is lower than the protection level IS, the level of the comparison signal of the comparing unit 7018 is high. As the level of the comparison signal of the comparing unit 7018 is high and maintained for a time T3, the delay circuit DL2 outputs a high-level output signal, which means that the output current $I_{OUT}$ is too large, as shown in FIG. 2, and over current occurs. When the level of the output signal of the delay circuit DL2 is high, the level of the output signal of the OR gate OR1 is also high and the output signal is output to the AND gate AND.

When the levels of the output signals of the delay circuits DL2, DL3 are both high, the level of the output signal of the AND gate AND will also be high. At this time, the level of the output signal of the OR gate OR2 is high. Thereby, the level of the output signal of the flip-flop 7020 is also high. Then, the NOR gate NOR will cut off the transistor 7021 and enable the protection signal FPOB for disabling the power supply 10.

Figure 6:
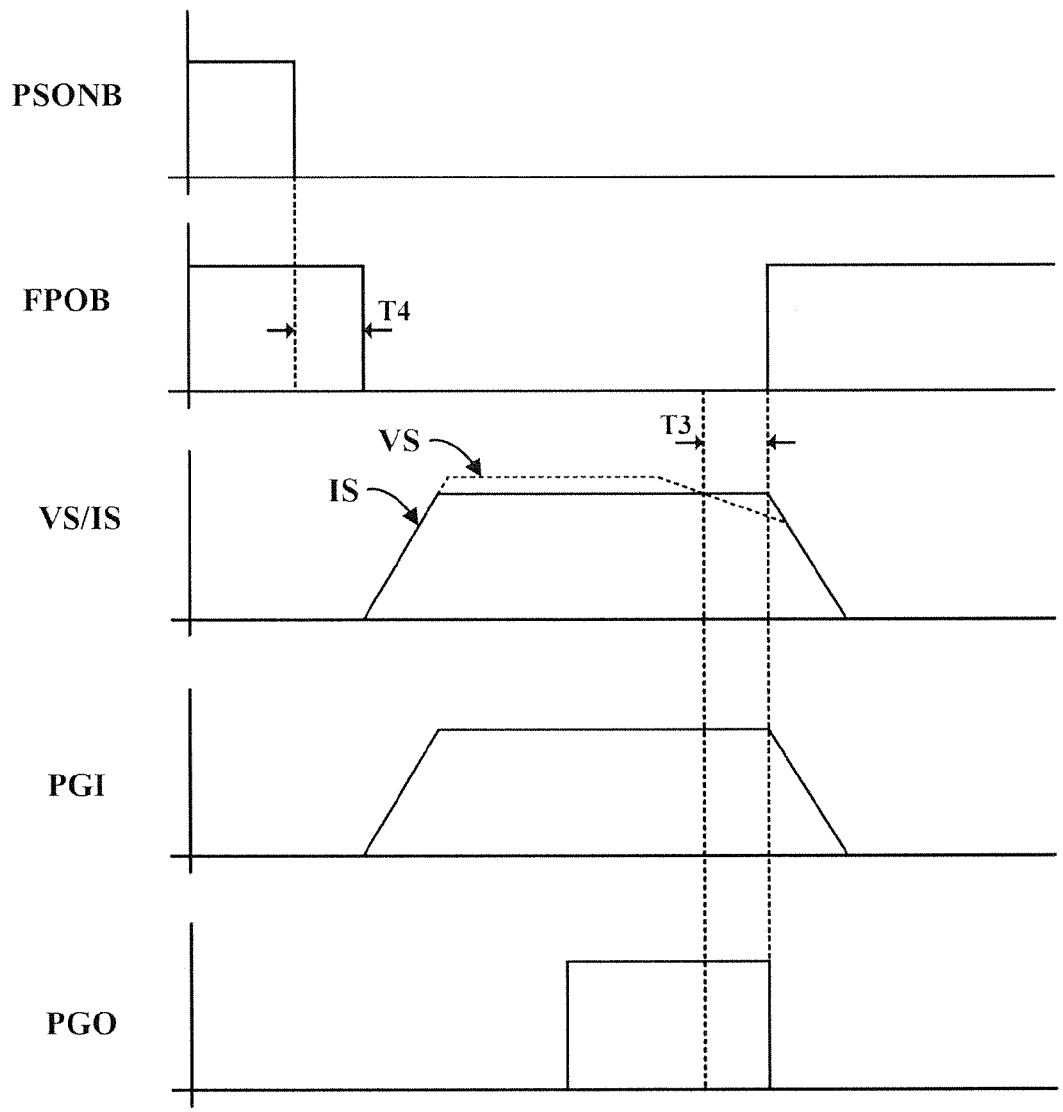
FIG. 6 shows wave diagrams of the protection chip executing over-current protection according to the present invention.

FIG. 6 shows wave diagrams of the protection chip executing over-current protection according to the present invention. As shown in the figure, when the power supply 10 is operating normally, the sensing signal VS is higher than the protection level IS. As over current occurs, the sensing signal VS will be lower than the protection level IS; the comparing unit 7018 will output a high-level comparison signal. After the delay time T3 by the delay circuit DL2, this comparison signal is transmitted to the OR gate OR1 so that the OR gate OR1 outputs a high-level output signal to the OR gate OR2. The level of the output signal of the OR gate OR2 becomes high and the output signal is transmitted to the NOR gate NOR via the flip-flop 7020. Then the level of the output signal of the NOR gate NOR is low, which cuts off the transistor 7021 for enabling the protection signal FPOB and thus further shutting off the power supply 10.

Refer again to FIG. 3. The adjusting unit 7011 is coupled to the output of the comparing unit 701 and the programmable signal generating unit 7012. When the automatic adjusting device adjusts the output power of the power supply 10, the adjusting unit 7011 will produce an adjusting signal $ADS_{0-n}$ according to the comparison signal of the comparing unit 7018 for adjusting the level of the programmable current of the programmable signal generating unit 7012 and hence adjusting the protection level IS. Consequently, the maximum level of the output power can be adjusted. According to the present embodiment, adjusting the protection level IS can adjust the maximum level of the output current $I_{OUT}$. Accordingly, the programmable signal generating unit 7012 will adjust the protection level IS according to the comparison signal of the comparing unit 7018 for adjusting the output power.

In addition, the adjusting unit 7011 further receives the activation signal PSONB and the PGO signal and is controlled by the activation signal PSONB and the PGO signal. When the waveform of the activation signal PSONB is a specific waveform and the level of the PGO signal is high, the adjusting unit 7011 will produce the adjusting signal $ADS_{0-n}$ according to the comparison signal of the comparing unit 7018 for controlling the programmable signal generating unit 7012 to adjust the protection level IS. Thereby, the maximum level of the output power can be adjusted.

The specific waveform described above is shown in FIG. 9. The activation signal PSONB has three pulses. The width of the first pulse is larger than the width of the second and of the third. It is know that this specific waveform is different from the waveform of the activation signal PSONB in FIG. 4. When the adjusting unit 7011 receives the activation signal PSONB having the specific waveform and the high-level PGO signal, it will produce the adjusting signal $ADS_{0-n}$ according to the comparison signal of the comparing unit 7018. In other words, when the power supply 10 is operating normally and the activation signal has no specific waveform, the adjusting unit 7011 will not adjust the protection level IS. The specific waveform described above is only an embodiment of the present invention; the specific waveform according to the present invention is not limited to the one according to present embodiment. The PGO signal according to the present invention is used as a confirmation signal for making sure that the power supply 10 is normal. According to the present invention, another signal can also be used as the confirmation signal. Thereby, the adjusting unit 7011 can also adjust the protection level IS according to another signal and the activation signal PSONB having a specific waveform.

Figure 7:
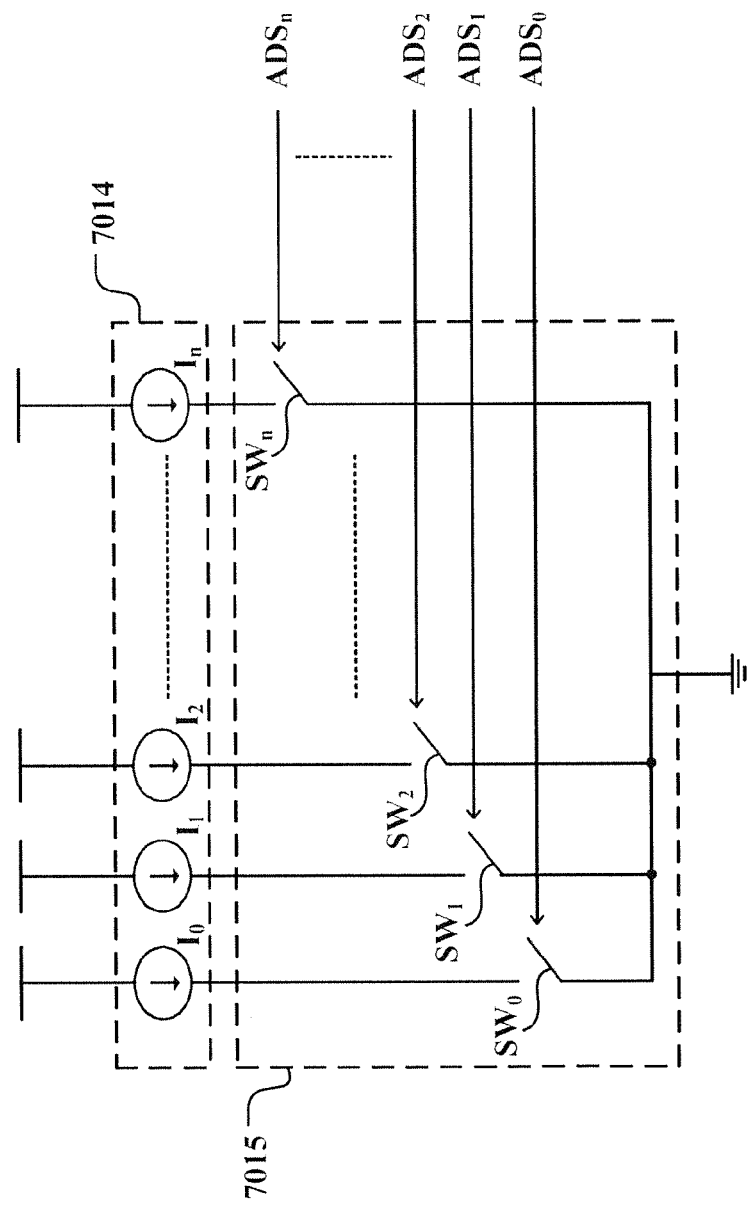
FIG. 7 shows a circuit diagram of the programmable signal generating unit according to the present invention.

FIG. 7 shows a circuit diagram of the programmable signal generating unit according to the present invention. As shown in the figure, the programmable signal generating unit 7012 includes a current source unit 7014, a switching unit 7015. The switching unit 7015 includes a plurality of switches $SW_0$-$SW_n$ turned on or off according to the adjusting signals $ADS_0$-$ADS_n$, respectively. The current source unit 7014 includes a plurality of current sources $I_0$-$I_n$ for providing a plurality of currents and producing the programmable currents. The current sources $I_0$-$I_n$ are coupled to the plurality of switches $SW_0$-$SW_n$ of the switching unit 7015, respectively. The adjusting signals $ADS_0$-$ADS_n$ are used for turning on or off the plurality of switches $SW_0$-$SW_n$ for controlling the currents of plurality of current sources $I_0$-$I_n$. When the plurality of switches $SW_0$-$SW_n$ are turned on, the currents of the plurality of current sources $I_0$-$I_n$ flow to the ground. Thereby, the programmable signal generating unit 7012 switches the plurality of switches $SW_0$-$SW_n$ according to the adjusting signals $ADS_{0-n}$. Then, the levels of the programmable currents can be adjusted. The protection level IS is adjusted accordingly.

Refer again to FIG. 2. When the automatic adjusting device adjusts the output power of the power supply 10, the test load 301 will be coupled to the output of the power supply 10 for drawing the output power. When the power supply 10 is turned on and provides the output power normally, the level of the PGO signal is high. The output power is output to the test load 301. At this time, the test load 301 will draw the output power according to a set value, for example, drawing 20 amperes of output current $I_{OUT}$. Thereby, the output power provided to the test load 301 corresponds to the set value. This set value is just the set maximum value of the output power for the power supply 10. Then, the sensing signal VS pertinent to the output power is used as the limiting level and adopted as the reference level for adjusting the protection level IS and the output power.

Please refer to FIG. 3. When the automatic adjusting device adjusts the output power of the power supply 10, the adjusting unit 7011 will control the programmable signal generating unit 7012 for adjusting the amplitude of the programmable current of the programmable signal generating unit 7012 and adjusting the protection level IS. Then the protection level IS is equivalent to the sensing signal VS. Accordingly, the maximum level of the output power can be adjusted. Besides, the adjusting unit 7011 and the programmable signal generating unit 7012 according to the present invention can also be applied to the comparing units 7016, 7017 for producing the reference levels Vref2, Vref3, which are used as the protection levels. Thereby, the maximum and the minimum values of the output voltage can be adjusted as well.

Figure 8A:
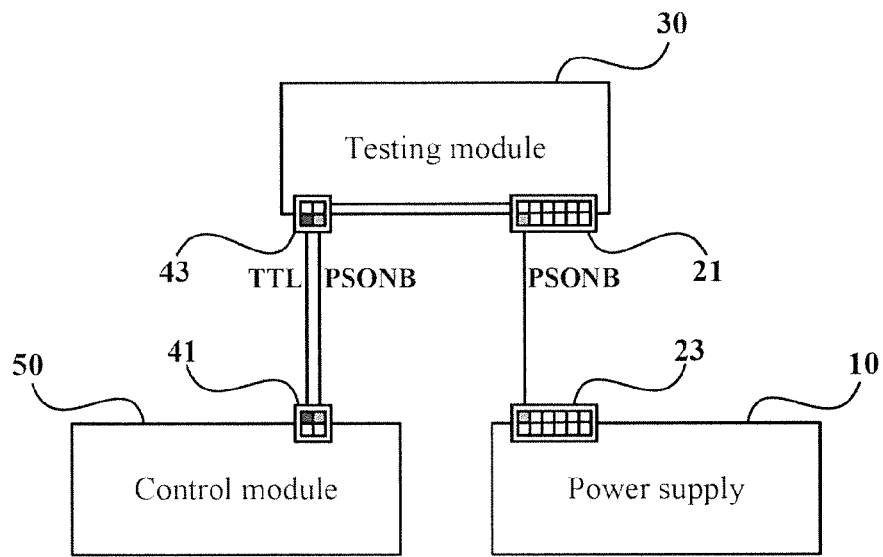
FIG. 8A shows a connection diagram of the power supply, the testing module, and the control module according to an embodiment of the present invention.
Figure 8B:
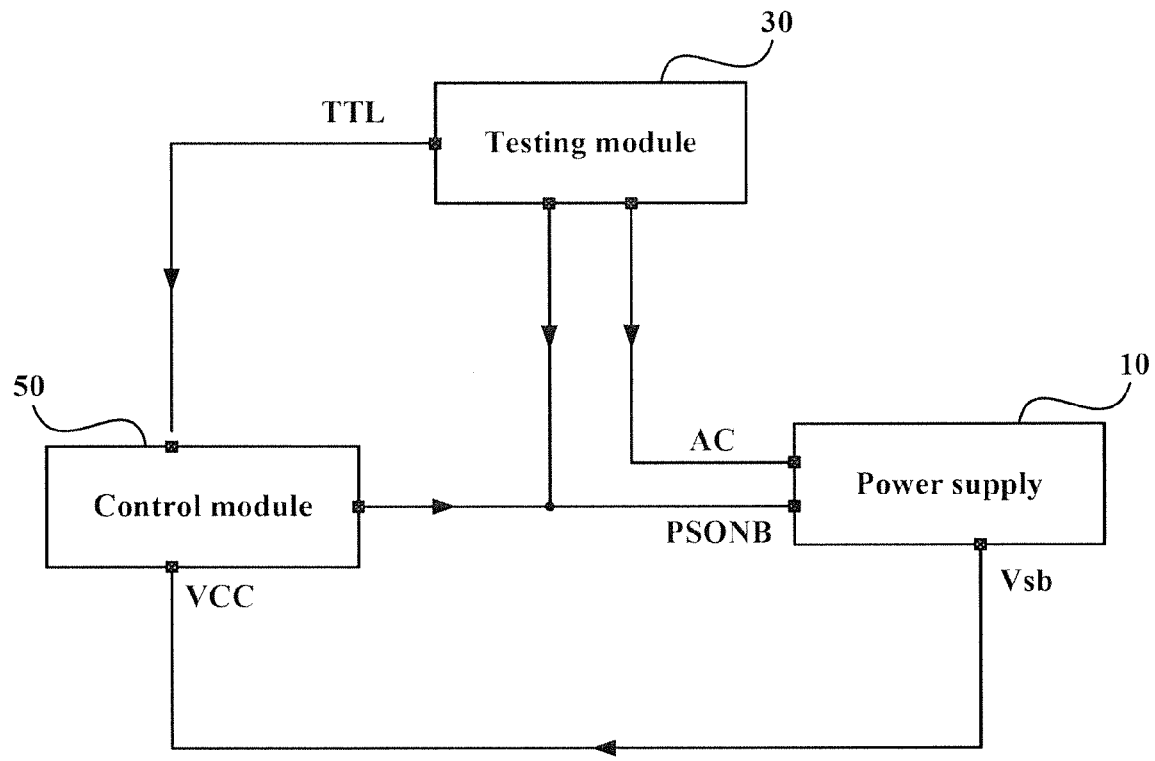
FIG. 8B shows a block diagram of the power supply, the testing module, and the control module according to an embodiment of the present invention.
Figure 9:
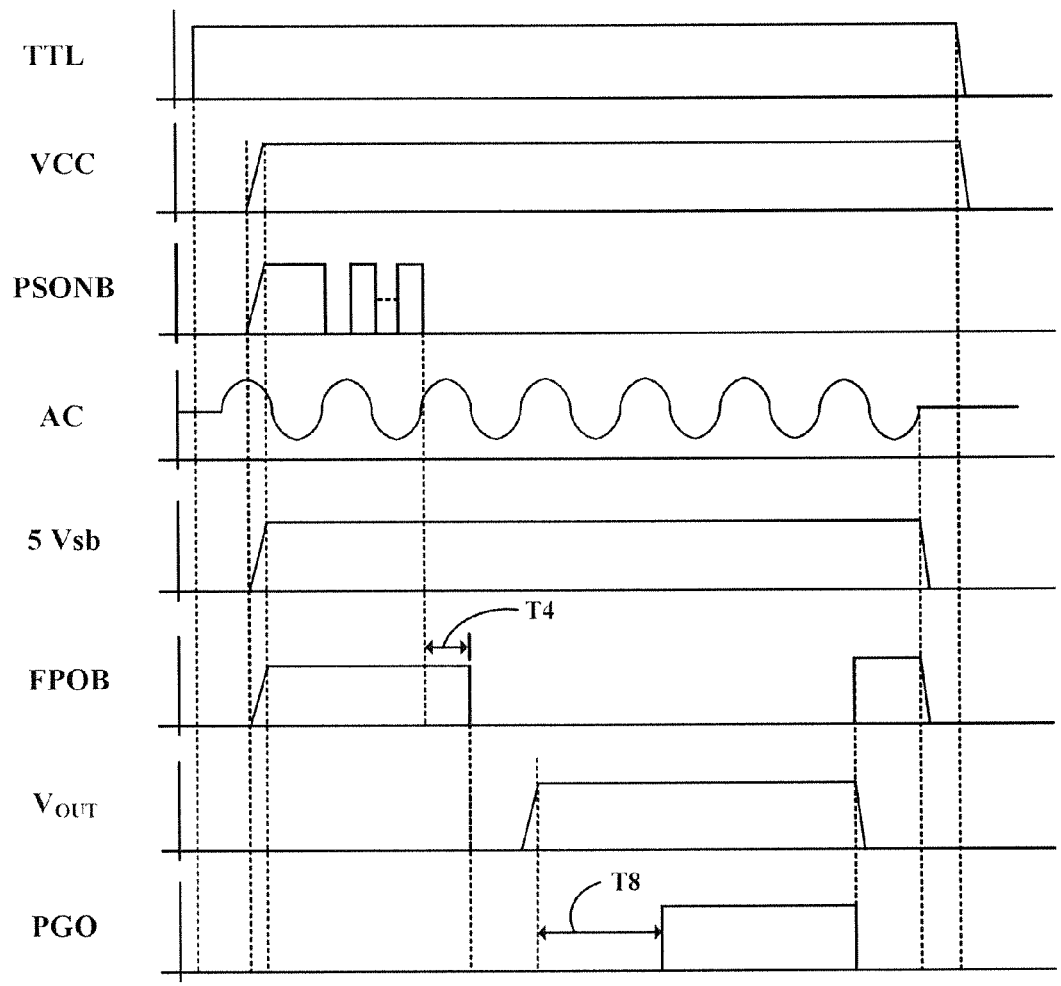
FIG. 9 shows wave diagrams of an automatic adjusting device according to the present invention.

FIGS. 8A, 8B, and 9 show a connection diagram, a block diagram, and wave diagrams of the power supply, the testing module, and the control module according to an embodiment of the present invention. The automatic testing device according to the present invention can be applied directly to the automatic test equipment (ATE). The automatic adjusting device according to the present invention further comprises a testing module 30 and a control module 50. The testing module 30 is disposed in the ATE for producing a testing signal TTL and providing the input power AC to the power supply 10. The power supply 10 provides a supply power Vsb to the control module 50 according to the input power AC and the supply power Vsb is used as the input power VCC of the control module 50. The control module 50 outputs the activation signal PSONB having the specific waveform to the power supply 10 according to the testing signal TTL.

When the protection chip 701 of the power supply 10 receives the activation signal PSONB, as shown in FIG. 2, after the time T4, the protection signal FPOB is disabled. The power supply 10 is activated and the output power is supplied. Then after the time T8, the protection chip 701 enables the PGO signal. After the testing module 30 receives the high-level PGO signal, the test load 301 in the testing module 30, as shown in FIG. 2, starts to draw the output power according to the set value for producing the sensing signal VS and the limiting level. When the PGO signal is established, the protection chip 701 performs automatic adjusting according to the activation signal PSONB and the PGO signal.

Furthermore, as shown in FIG. 8A, the control module 50 has a connector 41; the testing module 30 has a connector 43. The control module 50 outputs the activation signal PSONB to the testing module 30 via the connectors 30, 43. The connector 43 is connected electrically with a connector 21. Thereby, the connector 43 transmits the activation signal PSONB to the connector 21. Then, through the connector 21, the activation signal PSONB is transmitted to a connector 23 of the power supply 10 and thus controlling the power supply to adjust automatically.

To sum up, the automatic adjusting device for output power according to the present invention is used for adjusting the output power of a power supply. The automatic adjusting device uses the programmable signal generating unit to adjust the protection level and thereby adjusting the output power automatically. Without using variable resistors, no manual adjustment of the resistance of the variable resistors for adjusting the output power is required. Hence, the problem of intensive use of labor can be solved. In addition, the programmable signal generating unit can be disposed in the protection chip and thus avoiding damages. Thereby, the present invention can improve the accuracy of adjusting the output power.

Accordingly, the present invention conforms to the legal requirements owing to its novelty, nonobviousness, and utility. However, the foregoing description is only embodiments of the present invention, not used to limit the scope and range of the present invention. Those equivalent changes or modifications made according to the shape, structure, feature, or spirit described in the claims of the present invention are included in the appended claims of the present invention.

The invention claimed is:

1. An automatic adjusting device used for adjusting an output power of a power supply, comprising a testing module and an automatic adjusting circuit, and said automatic adjusting circuit including:
    a comparing unit, comparing a limiting level and a protection level for producing a comparison signal, and said protection level limiting said output power according to confirmation signal, said confirmation signal used for indicating the state of said output power, said output power provided by said power supply; and
    a programmable signal generating unit, generating said protection level, according to an output current of said power supply, and adjusting said protection level according to said comparison signal for adjusting said output power;
    wherein said testing module draws said output power according to said confirmation signal for producing said limiting level.

2. The automatic adjusting device as claimed in claim 1, said testing module comprising a test load coupled to said power supply, said test load drawing said output power according to a set value for producing said limiting level, and the level of said output power provided to said test load by said power supply corresponding to said set value.

3. The automatic adjusting device as claimed in claim 2, wherein said automatic adjusting circuit further includes a sensing device coupled to said comparing unit and an output of said power supply, said sensing device produces said limiting level according to the level of said output power provided to said test load by said power supply.

4. The automatic adjusting device as claimed in claim 1, wherein said automatic adjusting circuit further includes an adjusting unit producing an adjusting signal according to said comparison signal for controlling said programmable signal generating unit to adjust said protection level.

5. The automatic adjusting device as claimed in claim 1, wherein said programmable signal generating unit is a programmable current source, and said automatic adjusting circuit further includes a impedance device coupled to an output of said power supply and said output power, said programmable current source is coupled to said impedance device and said comparing unit; said programmable current source provides a programmable current and produces said protection level; said protection level is determined by the level of said programmable current and the impedance of said impedance device; and said comparison signal adjusts the level of said programmable current for adjusting said protection level.

6. The automatic adjusting device as claimed in claim 1, wherein said comparing unit and said programmable signal generating unit are integrated in a protection chip of said power supply.

7. The automatic adjusting device as claimed in claim 1, wherein said limiting level corresponds to a set value, and said programmable signal generating unit adjusts said protection level according to said comparison signal.

8. The automatic adjusting device as claimed in claim 1, wherein said protection level limits a maximum level of said output power provided by said power supply, and said programmable signal generating unit adjusts said protection level according to said comparison signal for adjusting said maximum level of said output power.

9. The automatic adjusting device as claimed in claim 1, further comprising:
    a control module, producing an activation signal according to said testing signal;
    wherein said testing module produces said testing signal and providing an input power to said power supply, said power supply receives said input power and provides said output power according to said activation signal; after said power supply provides said output power, said confirmation signal is produces; said testing module draws said output power according to said confirmation signal and a set value for producing said limiting level; and the level of said output power provided to said testing module by said power supply corresponds to said set value.

10. The automatic adjusting device as claimed in claim 9, wherein said power supply provides a supply power to said control module according to said input power for providing the power required by said control module for producing said activation signal.

11. The automatic adjusting device as claimed in claim 9, wherein said automatic adjusting circuit includes an adjusting unit controlled by said activation signal said confirmation signal, said adjusting unit produces an adjusting signal according to said comparison signal for controlling said programmable signal generating unit to adjust said protection level.

* * * * *